(12) United States Patent
Temnorod (10) Patent No.: US 11,748,721 B1
(45) Date of Patent: Sep. 5, 2023

(54) PROCURING AND PRESENTING DEPOSIT TRANSACTION DETAILS

(71) Applicant: Andre Temnorod, Shaker Height, OH (US)

(72) Inventor: Andre Temnorod, Shaker Height, OH (US)

( * ) Notice: Subject to any disclaimer, the term of this patent is extended or adjusted under 35 U.S.C. 154(b) by 0 days.

(21) Appl. No.: 17/694,621

(22) Filed: Mar. 14, 2022

(51) Int. Cl.
  *G06Q 20/10* (2012.01)
  *G06Q 20/06* (2012.01)
  *G06Q 20/40* (2012.01)

(52) U.S. Cl.
  CPC ......... *G06Q 20/108* (2013.01); *G06Q 20/065* (2013.01); *G06Q 20/4012* (2013.01); *G06Q 20/4016* (2013.01)

(58) Field of Classification Search
  None
  See application file for complete search history.

(56) References Cited

U.S. PATENT DOCUMENTS

| | | | | |
|---|---|---|---|---|
| 5,978,780 | A * | 11/1999 | Watson | G06Q 40/02 705/40 |
| 10,762,506 | B1 * | 9/2020 | Cash | G06Q 20/206 |
| 2006/0036553 | A1 * | 2/2006 | Gupta | G06Q 20/0855 705/52 |
| 2006/0149671 | A1 * | 7/2006 | Nix | G06Q 20/102 705/40 |
| 2010/0241569 | A1 * | 9/2010 | Rivest | G06Q 20/3674 705/64 |
| 2011/0295725 | A1 * | 12/2011 | Gee | G06Q 40/02 705/40 |
| 2014/0337175 | A1 * | 11/2014 | Katzin | G06Q 20/326 705/26.62 |
| 2021/0042722 | A1 * | 2/2021 | Wolter | G06Q 20/202 |

FOREIGN PATENT DOCUMENTS

| | | | | |
|---|---|---|---|---|
| WO | WO-2007070980 A1 * | 6/2007 | | G06Q 20/027 |
| WO | WO-2019043454 A1 * | 3/2019 | | G06Q 20/065 |

OTHER PUBLICATIONS

Awrey, D, et al. "The Shadow Payment System", Journal of Corporation Law 43.4: 775-816. Iowa City: University of Iowa, College of Law. (Summer 2018) (Year: 2018).*

* cited by examiner

*Primary Examiner* — Neha Patel
*Assistant Examiner* — Clay C Lee
(74) *Attorney, Agent, or Firm* — Cygnet IP Law, P.A.; Stephen W. Aycock, II (57) ABSTRACT

Some implementations can include an application to procure and present transaction details. In some implementations, the application is a software application that presents a user interface comprising transaction details corresponding to a user's transaction. In some implementations, the application provides an option to a user to choose to receive details of a transaction. In some implementations, the user can choose to receive details of the transaction by selecting an option. In some implementations, upon the user selecting the option, the application requests the user to provide access credentials to access an account associated with the user from which details of the transaction can be retrieved. In some implementations, upon the user providing the user access credentials, the application accesses the account associated with the user to retrieve the details of the transaction and then presents the retrieved details of the transaction to the user for review.

20 Claims, 9 Drawing Sheets

PROCURING AND PRESENTING DEPOSIT TRANSACTION DETAILS

FIELD

Some implementations relate to a computerized online banking system, and in particular, to an application within an online banking system for procuring and presenting deposit transaction details of deposits, for example, via a user interface.

BACKGROUND

When merchants receive payments from third parties, e.g., third-party payment acquisition platforms (such as Stripe, Amazon, Shopify, etc.), a payment deposited by a third-party in a merchant's financial account may correspond to multiple transactions involving sales of a merchant's goods or services on the third-party platform. As this cumulative payout generally appears as a single deposit on the merchant's financial statement (e.g., within an online banking account statement), the merchant would not be able to identify from within the online banking interface the transactions corresponding to which the payment was deposited in the merchant's account. The merchant would need to log into the third-party payment acquisition platform to view the relevant transactions corresponding to the deposit and would have to view the relevant sales transactions on the third-party website.

A need may therefore exist for an online system, and more specifically, an application, e.g., a software application, that permits a user such as a merchant to view on its financial statement all transactions related to a payment deposited by a third-party payment acquisition platform in a financial account of the merchant corresponding to the financial statement. For example, the third-party is a payment platform and the financial account is a bank account, wherein the payment platform deposits a payment to the merchant's bank account.

Moreover, when merchants receive deposits into their bank accounts corresponding to payments from third-party payment acquisition platforms, the financial statement (e.g., a bank account statement) does not generally provide details of the goods or services of the merchant that were sold by the third-party platform corresponding to the payment deposited in the account. The merchant would need to log into the third-party platform to view the goods and services data corresponding to the deposit and would have to view such transaction data on a different website.

A need may therefore exist for an online system, and more specifically, an application that enables a merchant to view on its financial statement goods and services sold by a third-party corresponding to a payment deposited by the third-party in the financial account of the merchant corresponding to the financial statement. For example, the third-party is a payment platform and the financial account is a bank account, where the payment platform deposits a payment in the merchant's bank account corresponding to sale of the merchant's goods/services.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Some implementations include a method for providing a user-interface element in an online banking user interface. In some implementations, the user-interface element may be provided in conjunction with a deposit transaction received from a third-party payment acquisition platform. In some implementations, the deposit transaction may correspond to an account in the third-party payment acquisition platform associated with a user. In some implementations, the method includes presenting a user-interface for receiving user access credentials for the account in the third-party payment acquisition platform from the user in response to the user selecting the user-interface element corresponding to the deposit transaction. In some implementations, the method includes procuring enhanced deposit transaction information corresponding to the deposit transaction. In some implementations, the enhanced deposit transaction information may include one or more details of the deposit transaction from the account associated with the user in the third-party payment acquisition platform using the user access credentials to access the account. In some implementations, the enhanced deposit transaction information may include additional transaction information beyond information contained in the deposit transaction. In some implementations, the method includes presenting the enhanced deposit transaction information within the online banking user interface.

In some implementations, the method includes receiving a request from the user for additional enhanced deposit transaction information corresponding to one or more items within the enhanced deposit transaction information. In some implementations, the additional enhanced deposit transaction information may include additional information beyond the additional transaction information contained in the enhanced deposit transaction information. In some implementations, the method includes procuring the additional enhanced deposit transaction information from the account associated with the user in the third-party payment acquisition platform using the user access credentials. In some implementations, the method includes presenting the additional enhanced deposit transaction information along with the enhanced deposit transaction information. In some implementations, the presenting may include providing one of the additional enhanced deposit transaction information procured from the third-party payment acquisition platform to the user or a user-interface of the third-party payment acquisition platform to communicate the additional enhanced deposit transaction information to the user.

In some implementations, the method includes detecting an incoming deposit transaction from the account associated with the user in the third-party payment acquisition platform. In some implementations, the method includes presenting the incoming deposit transaction along with an option to receive additional deposit information. In some implementations, the method includes receiving a request from the user to present the additional deposit information of the incoming deposit transaction. In some implementations, the request may correspond to the user exercising the option. In some implementations, the method includes procuring additional information corresponding to the additional deposit information from the account associated with the user in the third-party payment acquisition platform using the user access credentials. In some implementations, the method includes presenting the additional deposit information to the user along with the incoming deposit transaction. In some implementations, the incoming deposit transaction may be one of a pending deposit transaction or a completed deposit transaction.

In some implementations, the method includes analyzing past deposit transactions corresponding to the account associated with the user in the third-party payment acquisition platform. In some implementations, the method includes retrieving additional information corresponding to a predicted deposit transaction. In some implementations, the predicted deposit transaction may be determined based on the analyzing of past deposit transactions. In some implementations, the method includes presenting the additional information along with the predicted deposit transaction.

In some implementations, the method includes analyzing past deposit transactions corresponding to the account associated with the user in the third-party payment acquisition platform. In some implementations, the method includes retrieving additional information corresponding to a pending deposit transaction. In some implementations, the pending deposit transaction may be identified based on the analyzing of past deposit transactions. In some implementations, the method includes presenting the additional information along with the pending deposit transaction.

In some implementations, the method includes receiving a request from the user for additional deposit transaction information. In some implementations, the method includes procuring additional information corresponding to the additional deposit transaction information from the account associated with the user in the third-party payment acquisition platform using the user access credentials. In some implementations, the method includes presenting the additional deposit transaction information along with the predicted deposit transaction.

In some implementations, the method includes receiving a request from the user for additional deposit transaction information. In some implementations, the method includes procuring additional information corresponding to the additional deposit transaction information from the account associated with the user in the third-party payment acquisition platform using the user access credentials. In some implementations, the method includes presenting the additional deposit transaction information along with the pending deposit transaction.

Some implementations include a method for providing an option in an online banking user interface. In some implementations, the option may be provided in conjunction with a deposit transaction received from a third-party payment acquisition platform. In some implementations, the deposit transaction may correspond to an account in the third-party payment acquisition platform associated with a user. In some implementations, the method includes presenting a user-interface for receiving user access credentials for the account in the third-party payment acquisition platform from the user in response to the user exercising the option corresponding to the deposit transaction. In some implementations, the method includes procuring enhanced deposit transaction information corresponding to the deposit transaction. In some implementations, the enhanced deposit transaction information may include one or more details of the deposit transaction from the account associated with the user in the third-party payment acquisition platform using the user access credentials to access the account. In some implementations, the enhanced deposit transaction information may include additional transaction information beyond information contained in the deposit transaction. In some implementations, the method includes presenting the enhanced deposit transaction information within the online banking user interface.

In some implementations, the method includes receiving a request from the user for additional enhanced deposit transaction information corresponding to one or more items within the enhanced deposit transaction information. In some implementations, the additional enhanced deposit transaction information may include additional information beyond the additional transaction information contained in the enhanced deposit transaction information. In some implementations, the method includes procuring the additional enhanced deposit transaction information from the account associated with the user in the third-party payment acquisition platform using user access credentials. In some implementations, the method includes presenting the additional enhanced deposit transaction information along with the enhanced deposit transaction information. In some implementations, the presenting may include providing one of the additional enhanced deposit transaction information procured from the third-party payment acquisition platform to the user or a user-interface of the third-party payment acquisition platform to communicate the additional enhanced deposit transaction information to the user.

In some implementations, the method includes detecting an incoming deposit transaction from the account associated with the user in the third-party payment acquisition platform. In some implementations, the method includes presenting the incoming deposit transaction along with a user interface element to receive additional deposit information. In some implementations, the method includes procuring additional information corresponding to the additional deposit information from the account associated with the user in the third-party payment acquisition platform using the user access credentials in response to the user selecting the user-interface element corresponding to the incoming deposit transaction. In some implementations, the method includes presenting the additional deposit information to the user along with the incoming deposit transaction. In some implementations, the incoming deposit transaction may be one of a pending deposit transaction or a completed deposit transaction.

In some implementations, the method includes analyzing past deposit transactions corresponding to the account associated with the user in the third-party payment acquisition platform. In some implementations, the method includes retrieving additional information corresponding to a predicted deposit transaction. In some implementations, the predicted deposit transaction may be determined based on the analyzing of past deposit transactions. In some implementations, the method includes presenting the additional information along with the predicted deposit transaction.

In some implementations, the method includes analyzing past deposit transactions corresponding to the account associated with the user in the third-party payment acquisition platform. In some implementations, the method includes retrieving additional information corresponding to a pending deposit transaction. In some implementations, the pending deposit transaction may be identified based on the analyzing of past deposit transactions. In some implementations, the method includes presenting the additional information along with the pending deposit transaction.

In some implementations, the method includes receiving a request from the user for additional deposit transaction information. In some implementations, the method includes procuring additional information corresponding to the additional deposit transaction information from the account associated with the user in the third-party payment acquisition platform using the user access credentials. In some implementations, the method includes presenting the additional deposit transaction information along with the predicted deposit transaction.

In some implementations, the method includes receiving a request from the user for additional deposit transaction information. In some implementations, the method includes procuring additional information corresponding to the additional deposit transaction information from the account associated with the user in the third-party payment acquisition platform using the user access credentials. In some implementations, the method includes presenting the additional deposit transaction information along with the pending deposit transaction.

Some implementations include a method for presenting a user interface within an online banking user interface to receive user access credentials for a third-party payment acquisition platform account associated with a user. In some implementations, the method includes analyzing one or more past deposits and one or more past transactions from the third-party payment acquisition platform corresponding to the third-party payment acquisition platform account associated with the user. In some implementations, the method includes predicting a future deposit transaction based on the analyzing. In some implementations, the predicted future deposit includes third-party payment acquisition platform transactions that are not included in one or more of a completed deposit transaction or a pending deposit transaction. In some implementations, the method includes presenting the predicted future deposit transaction along with a user interface element to obtain enhanced deposit transaction information. In some implementations, the method includes procuring enhanced deposit transaction information corresponding to the predicted future deposit transaction. In some implementations, the predicted future deposit transaction may be identified based on the analyzing of past transactions corresponding to the third-party payment acquisition platform account associated with the user. In some implementations, the method includes presenting the enhanced deposit transaction information along with the predicted future deposit transaction to the user when the user interface element to obtain enhanced deposit transaction information is selected.

In some implementations, the method includes receiving a request from the user for additional enhanced deposit transaction information corresponding to one or more items within the enhanced deposit transaction information. In some implementations, the additional enhanced deposit transaction information may include additional information beyond additional transaction information contained in the enhanced deposit transaction information. In some implementations, the method includes procuring the additional enhanced deposit transaction information from the third-party payment acquisition platform account associated with the user. In some implementations, the method includes presenting the additional enhanced deposit transaction information along with the enhanced deposit transaction information. In some implementations, the presenting may include providing one of the additional enhanced deposit transaction information procured from the third-party payment acquisition platform to the user or a user-interface of the third-party payment acquisition platform to communicate the additional enhanced deposit transaction information to the user.

In some implementations, the method includes detecting an incoming deposit transaction from the third-party payment acquisition platform account associated with the user. In some implementations, the method includes presenting the incoming deposit transaction along with an option to receive additional deposit information. In some implementations, the method includes receiving a request from the user to present the additional deposit information of the incoming deposit transaction. In some implementations, the request may correspond to the user exercising the option. In some implementations, the method includes procuring additional information corresponding to the additional deposit information from the third-party payment acquisition platform account associated with a user. In some implementations, the method includes presenting the additional deposit information to the user along with the incoming deposit transaction. In some implementations, the incoming deposit transaction may be one of a pending deposit transaction or a completed deposit transaction.

DETAILED DESCRIPTION

The systems and methods provided herein may overcome one or more deficiencies of some conventional applications and user interfaces for presenting transactions. For example, in some implementations, the application is a software application that presents a user interface comprising transaction details corresponding to a user's transaction. In some implementations, the application provides an option to a user to choose to receive details of a transaction. In some implementations, the user can choose to receive details of the transaction by selecting an option. In some implementations, upon the user selecting the option, the application requests the user to provide access credentials to access an account associated with the user from which details of the transaction can be retrieved. In some implementations, upon the user providing the user access credentials, the application accesses the account associated with the user to retrieve the details of the transaction and then presents the retrieved details of the transaction to the user for review.

In some implementations, a user, e.g., a merchant, has an account with a third-party payment acquisition platform and receives payments from the third-party payment acquisition platform for goods and/or services purchased by customers of the merchant from the merchant. In some implementations, the third-party payment acquisition platform makes a consolidated payment to the merchant corresponding to multiple sales of goods and/or services to multiple customers of the merchant. In some implementations, the present disclosure enables the user to view in the user's financial statement (e.g., a bank account statement) additional transaction information, referred to herein as enhanced deposit transaction information, corresponding to a consolidated payment deposited in the financial account (e.g., a bank account) of the user by selecting an option, e.g., a user-interface element, to view the additional transaction information. In some implementations, a user can view the enhanced deposit transaction information with the user interface corresponding to the financial account of the user. In some implementations, a user can view the enhanced deposit transaction information with the user interface of the third-party payment acquisition platform. In some implementations, the user can also select to view sub-transaction information corresponding to the enhanced deposit transaction information. For example, a merchant can first select to view individual payment amounts or details comprising a consolidated payment deposit from the third-party payment acquisition platform. Additionally, or optionally, the merchant can also select to view details of the goods/services sold corresponding to one or more of the individual payment amounts comprising the consolidated payment deposit.

Figure 1:
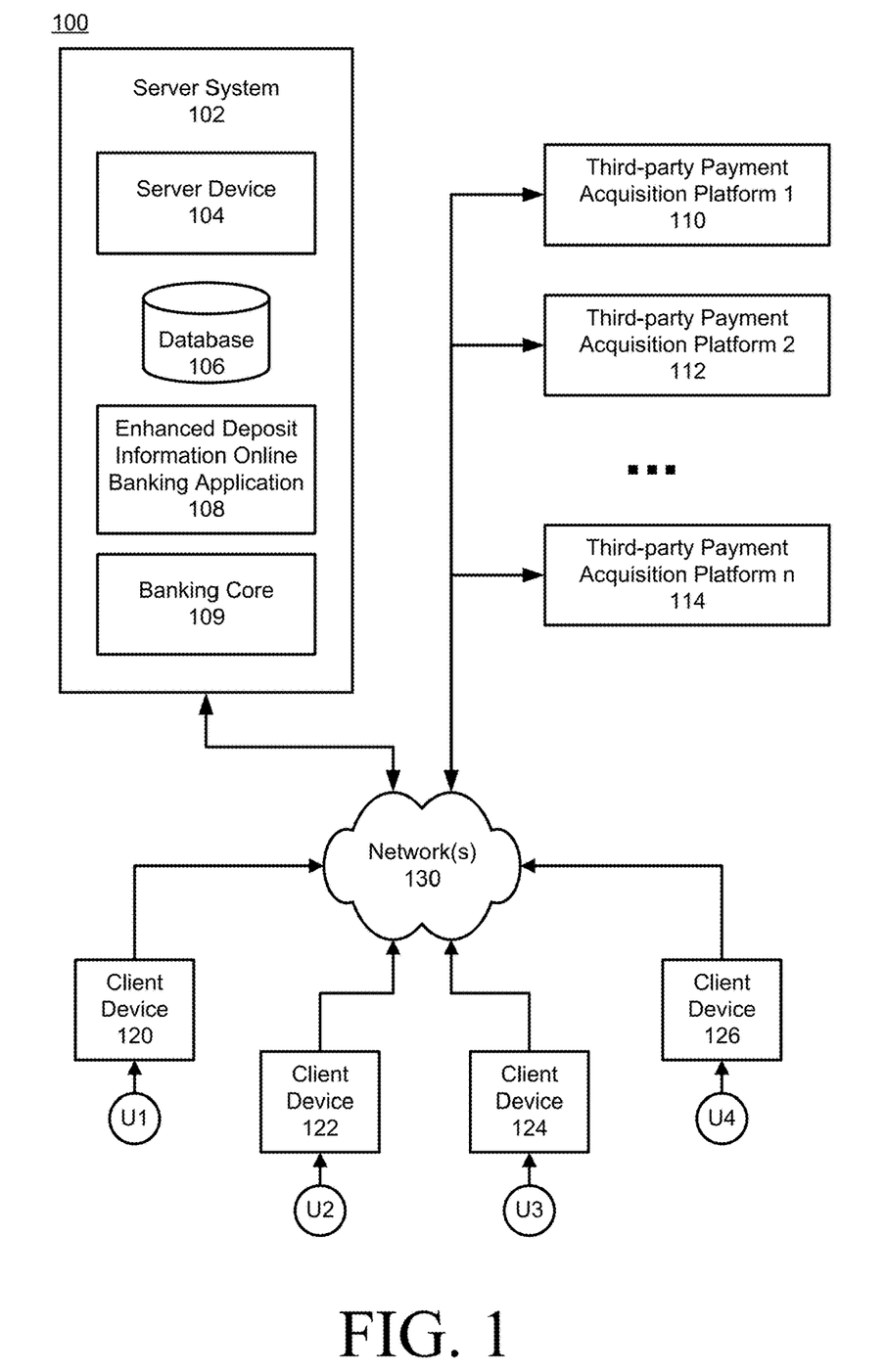
FIG. 1 is a block diagram of an example system which may be used for one or more implementations described herein.

FIG. 1 is a block diagram of an example system which may be used for one or more implementations described herein. Specifically, FIG. 1 is a block diagram of an example system 100 which may be used to implement one or more features described herein. In some implementations, the example system 100 includes a server system 102, a server device 104, a database 106, an enhanced deposit information online banking application 108 for presenting enhanced deposit transaction (e.g., a deposit made to an account) information, a banking core 109, and multiple third-party payment acquisition platforms (1 to n) 110 to 114 (110, 112, 114), one or more networks 130, and multiple client devices (U1-U4) 120 to 126 (120, 122, 124, 126).

Figure 2:
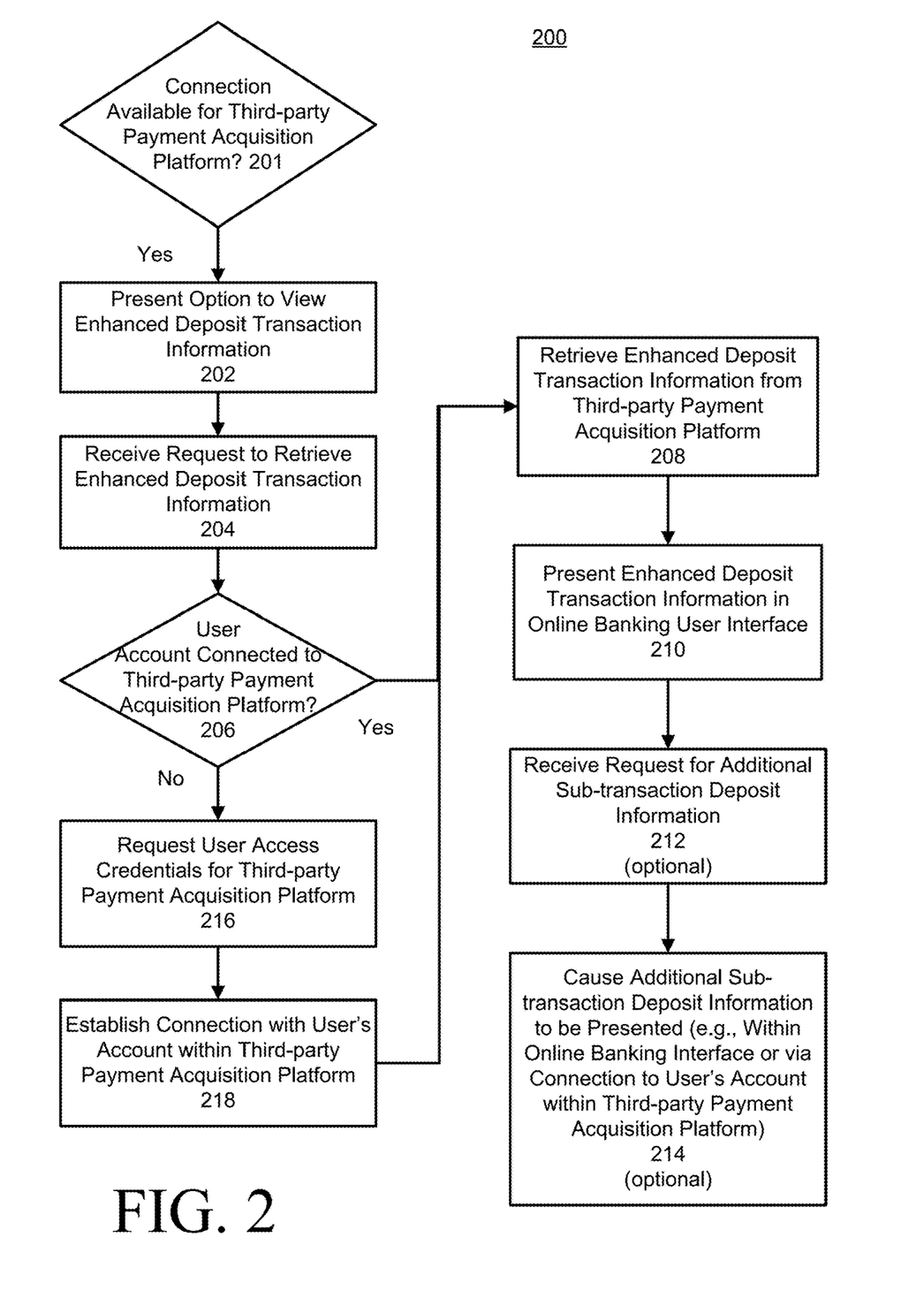
FIG. 2 is a flowchart of an example method for procuring and presenting enhanced deposit transaction details in accordance with some implementations.

FIG. 2 is a flowchart of an example method for procuring and presenting transaction details in accordance with some implementations. 200 is the example implementation disclosed in FIG. 2. Processing begins at 201, where the online system checks whether a connection is available within the online system to a third-party payment acquisition platform associated with a given deposit transaction. Processing then continues to 202.

At 202, if a connection is available to the third-party payment acquisition platform associated with the given deposit transaction, the online system presents an option to a user to view enhanced deposit transaction information. In this context, enhanced deposit transaction information refers to one or more details of a deposit transaction, i.e., a transaction corresponding to a deposit of payment made into an account of the user, from an account associated with the user in the third-party payment acquisition platform using the user access credentials to access the account. Processing then continues to 204.

At 204, the online system receives a request to retrieve enhanced deposit transaction information from the third-party payment acquisition platform. For example, a user may select a graphical user interface element associated with receiving enhanced deposit information. Processing continues to 206.

At 206, the online system checks whether the user's online banking account is already connected to the third-party payment acquisition platform (e.g., the online banking system already has access credentials for the user to the third-party payment acquisition platform). Processing continues to 208 if the user's account is connected to the third-party payment acquisition platform. Otherwise, processing continues to 216 if the user's account is not connected to the third-party payment acquisition platform.

At 216, the online system requests user access credentials to access the third-party payment acquisition platform. Processing continues to 218. At 218, the online system establishes a connection with the user's account in the third-party payment acquisition platform (e.g., via an API or other suitable mechanism). Processing continues to 208 after the online system establishes a connection with the user's account.

At 208, the online system proceeds to retrieve enhanced deposit transaction information from the third-party payment acquisition platform. Retrieving enhanced deposit information can include accessing transactions within the third-party payment acquisition platform that correspond to the deposit transaction. Correspondence can be determined based on information in the deposit transaction (e.g., a payout identifier or the like), or through querying the third-party payment acquisition platform for transactions in a relevant timeframe (e.g., transaction that have occurred between a previous payout deposit and the current payout deposit for which enhanced information is requested). Further, the online banking system can analyze the third-party payment acquisition platform behavior to determine how to group payment details with a payout deposit transaction. Also, a priori knowledge of the third-party payment acquisition platform payout process can be used to encode logic in the online banking platform for accessing deposit transaction details. Processing continues to 210.

At 210, the online system presents the enhanced deposit transaction information to the user through a user interface. The user interface may take different shapes or forms, e.g., display of information or audio dissemination of information. Processing continues to 212.

At 212, optionally or additionally, the online system receives a request for additional sub-transaction deposit information from the user. In this context, sub-transaction deposit information refers to one or more details of the enhanced deposit transaction information. Processing continues to 214.

At 214, optionally or additionally, the online system presents the additional sub-transaction deposit information to the user. In some implementations, the additional sub-transaction deposit information is presented within the online system's user interface. In some implementations, the additional sub-transaction deposit information is presented within a user-interface belonging to the third-party payment acquisition platform.

Figure 3:
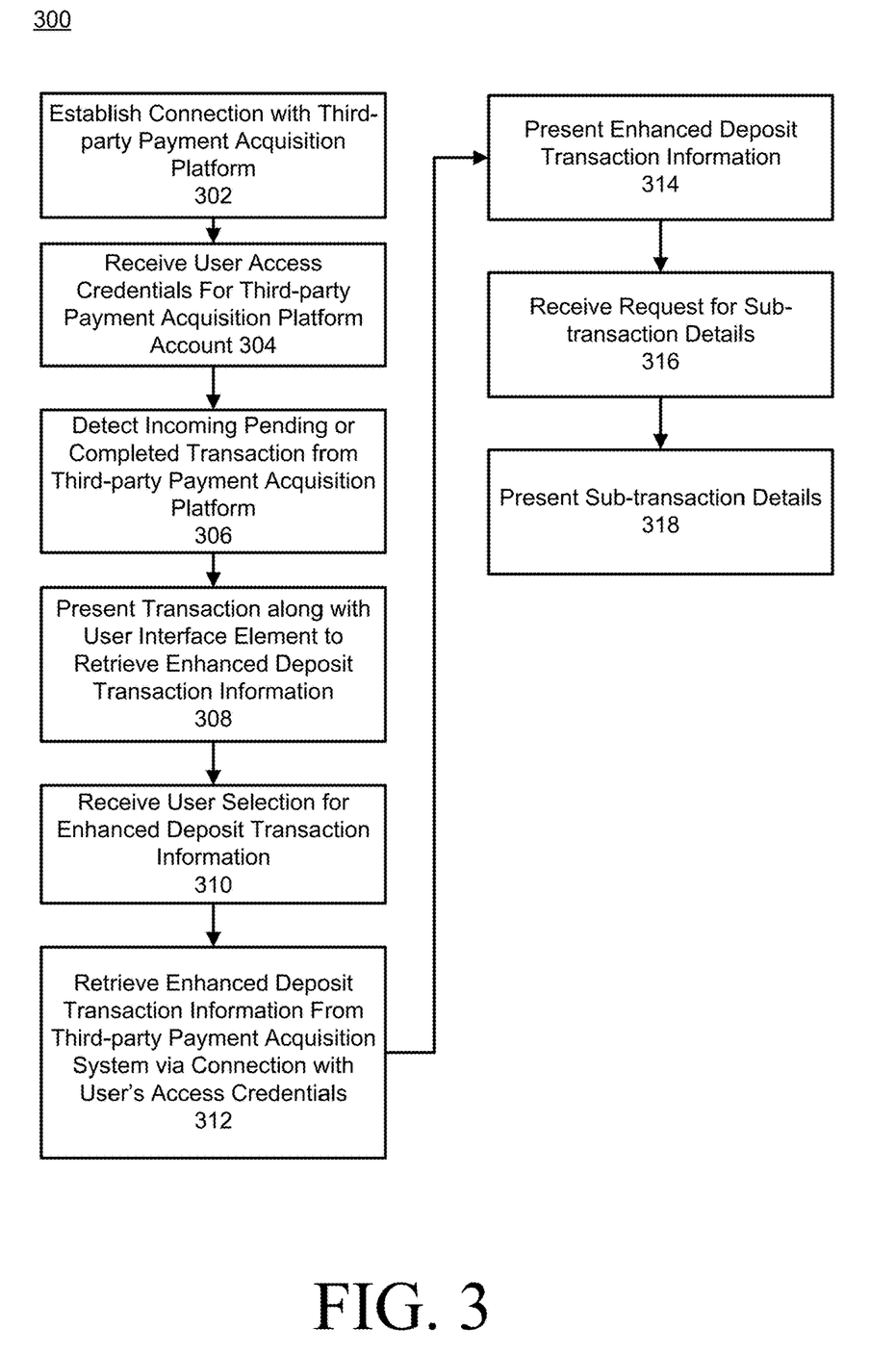
FIG. 3 is a flowchart of an example method for procuring and presenting enhanced deposit transaction details in accordance with some implementations.

FIG. 3 is a flowchart of an example method for procuring and presenting transaction details in accordance with some implementations. 300 is the example implementation disclosed in FIG. 3. Processing begins at 302, where the online system establishes a connection and/or an interface with the third-party payment acquisition platform. Processing continues to 304.

At 304, the online system receives user access credentials to secure access to an account associated with a user and belonging to the third-party payment acquisition platform. Processing continues to 306.

At 306, the online system detects an incoming pending deposit transaction or an incoming completed deposit transaction from the third-party payment acquisition platform. Processing continues to 308.

At 308, the online system presents the incoming pending deposit transaction or the incoming completed deposit transaction along with a user interface element to the user to enable retrieval of enhanced deposit transaction information. In this context, enhanced deposit transaction information refers to one or more details of a transaction, i.e., a transaction corresponding to a deposit of payment made into an account of the user from an account associated with the user and belonging to the third-party payment acquisition platform. Processing continues to 310.

At 310, the online system receives a user selection via the user interface element to retrieve the enhanced deposit transaction information from the third-party payment acquisition platform. The user interface element may take different shapes or forms, e.g., display or audio, etc., in order to e.g., display information or disseminate audio, etc. Processing continues to 312.

At 312, the online system retrieves enhanced deposit transaction information from the third-party payment acquisition platform via the connection with the third-party payment acquisition platform established using the user access credentials. For example, the online system can retrieve enhanced deposit information as described above in connection with 208. Processing continues to 314.

At 314, the online system presents the enhanced deposit transaction information. Processing continues to 316.

At 316, the online system receives a request for additional sub-transaction deposit information. In this context, sub-transaction deposit information refers to one or more details of the enhanced deposit transaction information. Processing continues to 318.

At 318, the online system presents the additional sub-transaction deposit information. In some implementations, the additional sub-transaction deposit information is presented within the online system's user interface. In some implementations, the additional sub-transaction deposit information is presented within a user-interface belonging to the third-party payment acquisition platform.

Figure 4:
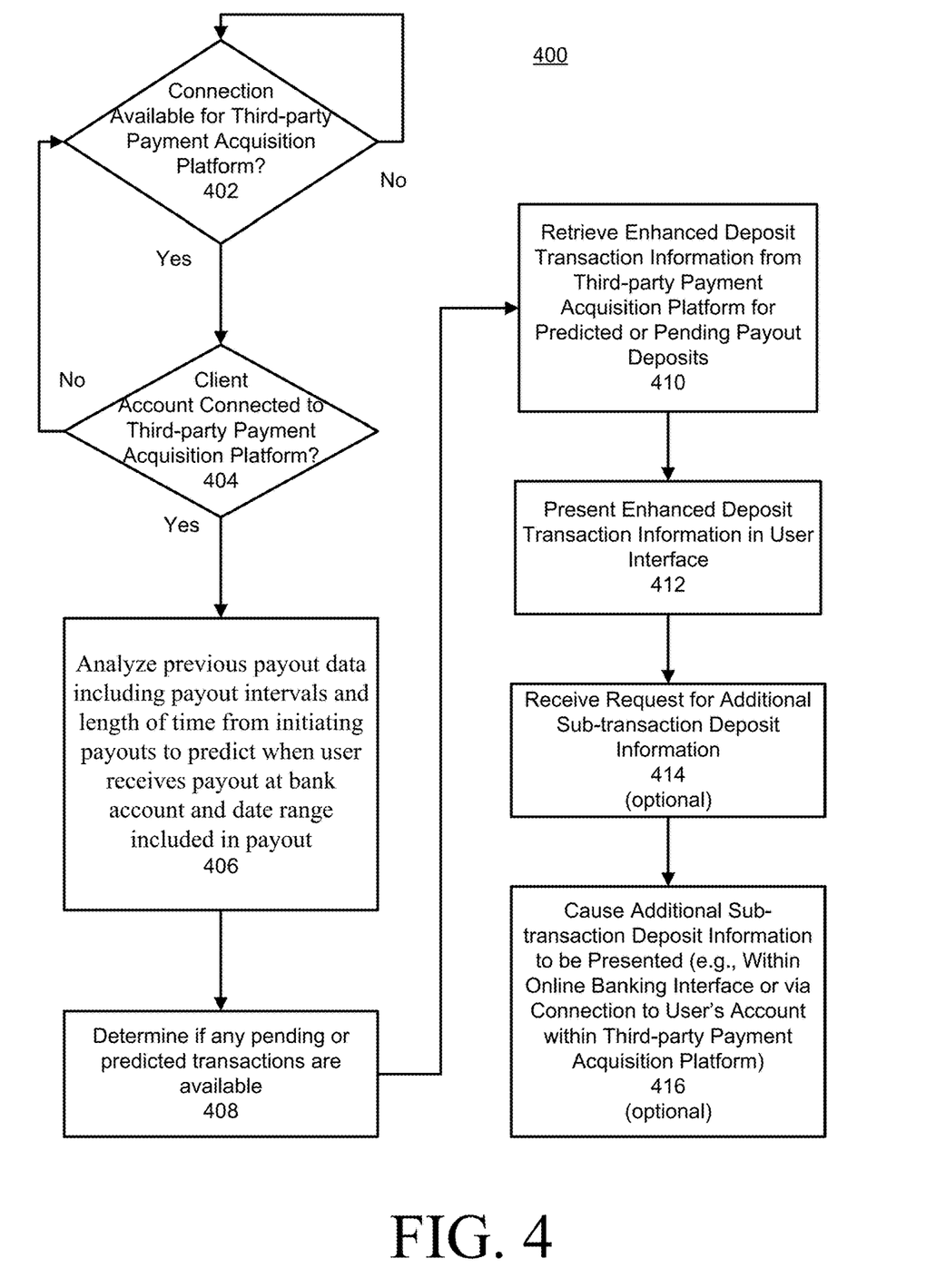
FIG. 4 is a flowchart of an example method for procuring and presenting enhanced deposit transaction details in accordance with some implementations.

FIG. 4 is a flowchart of an example method for procuring and presenting transaction details in accordance with some implementations. 400 is the example implementation disclosed in FIG. 4. Processing begins at 402, where the online system checks whether a connection is available to a third-party payment acquisition platform. Processing then continues to 404.

At 404, the online system checks whether the user's account is connected to the third-party payment acquisition platform. Processing continues to 406 if the user's account is connected to the third-party payment acquisition platform. Else, processing continues to 402.

At 406, the online system analyzes past transactions and previous payout data, for example, including payout intervals and length of time from initiating a payout to receiving the payout, to predict when a user can expect to receive a payout via a deposit transaction into the user's account as well as a date range within which the user can expect to receive the payout. Processing then continues to 408.

At 408, the online system determines, based on the analysis performed in 406, as to whether any predicted or pending deposit transactions are available. Processing continues to 410.

At 410, the online system retrieves enhanced deposit transaction information from the third-party payment acquisition platform for the predicted or pending deposit transactions via the connection with the third-party payment acquisition platform. In this context, enhanced deposit transaction information refers to one or more details of a transaction, i.e., a transaction corresponding to a deposit of payment made into an account of the user from an account associated with the user and belonging to the third-party payment acquisition platform. Processing then continues to 412.

At 412, the online system presents the enhanced deposit transaction information to the user through a user interface. The user interface may take different shapes or forms, e.g., display of information or audio dissemination of information. Processing continues to 414.

At 414, optionally or additionally, the online system receives a request for additional sub-transaction deposit information. In this context, sub-transaction deposit information refers to one or more details of the enhanced deposit transaction information. Processing continues to 416.

At 416, optionally or additionally, the online system presents the additional sub-transaction deposit information. In some implementations, the additional sub-transaction deposit information is presented within the online system's user interface. In some implementations, the additional sub-transaction deposit information is presented within a user-interface belonging to the third-party payment acquisition platform.

Figure 5:
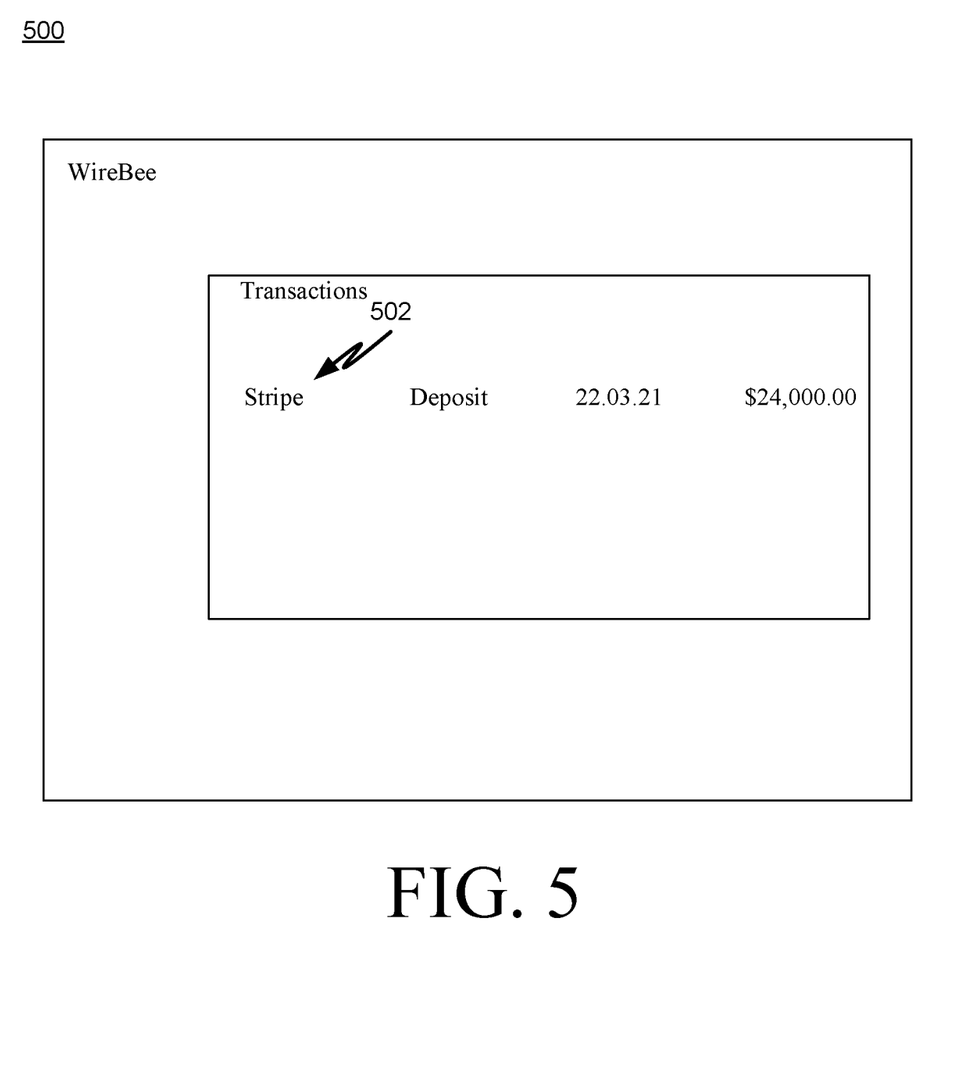
FIG. 5 is a diagram of an example illustration of a user interface displaying deposit transactions in accordance with some implementations.

FIG. 5 is a diagram of an example illustration of an example user interface displaying transactions in accordance with some implementations. 500 is an example user interface displaying transactions in an account associated with a user. FIG. 5 includes display of a transaction 502 from an example third-party payment acquisition platform—in this case, Stripe®, which is intended to be a non-limiting example for explanation purposes.

Figure 6:
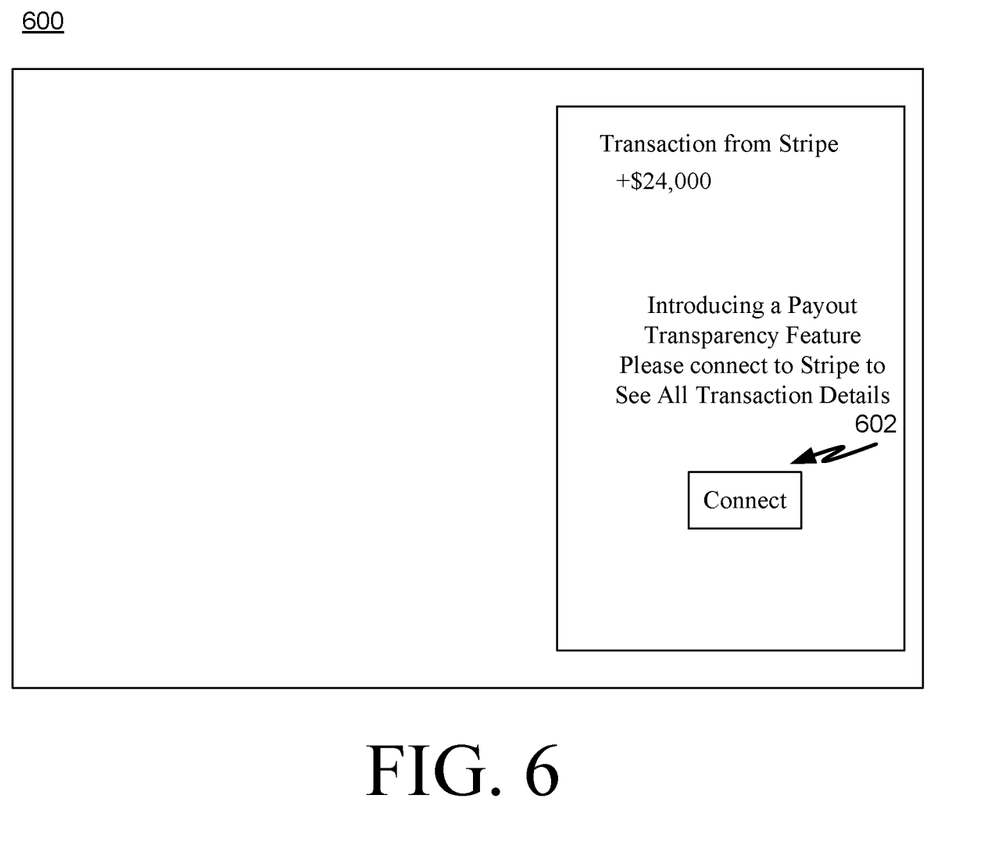
FIG. 6 is a diagram of an example illustration of a user interface displaying an example implementation described herein.

FIG. 6 is a diagram of an example illustration of a user interface displaying an example implementation described herein. 600 is an example user interface displaying an example user interface element 602 that provides an option to view additional transaction data, also referred to herein as enhanced deposit transaction information. In this context, enhanced deposit transaction information refers to one or more details of a transaction, i.e., a transaction corresponding to a deposit of payment made into an account of the user from an account associated with the user and belonging to the third-party payment acquisition platform.

Figure 7:
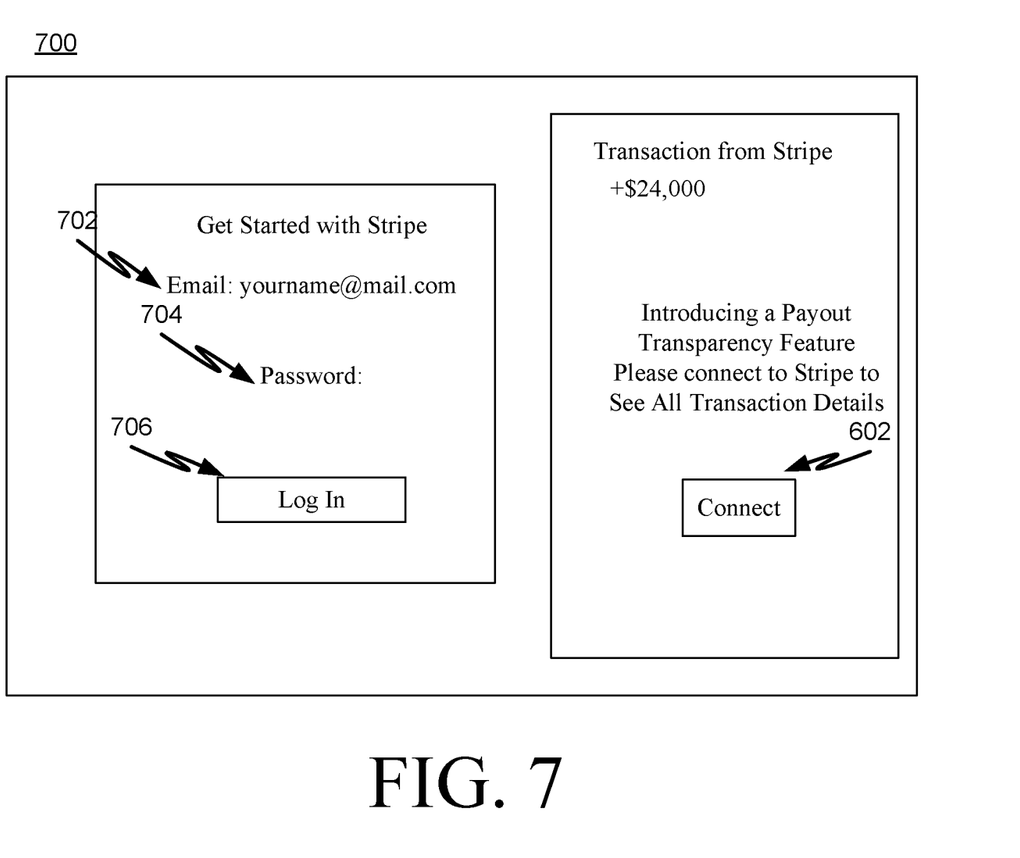
FIG. 7 is a diagram of an example illustration of a user interface displaying an interface for entering user access credentials in accordance with some implementations.

FIG. 7 is a diagram of an example illustration of a user interface displaying an interface for entering user access credentials in accordance with some implementations. 700 is an example user interface displaying an example user interface for receiving user access credentials from a user. This example user interface includes a field 702 for receiving the user's email address associated with an account belonging to the third-party payment acquisition platform—in this case, STRIPE®. The example user interface also includes a field 704 for receiving the user's password associated with the account belonging to the third-party payment acquisition platform. The example user interface further includes a button 706 for submitting the user access credentials, i.e., email address and password, to the third-party payment acquisition platform.

Figure 8:
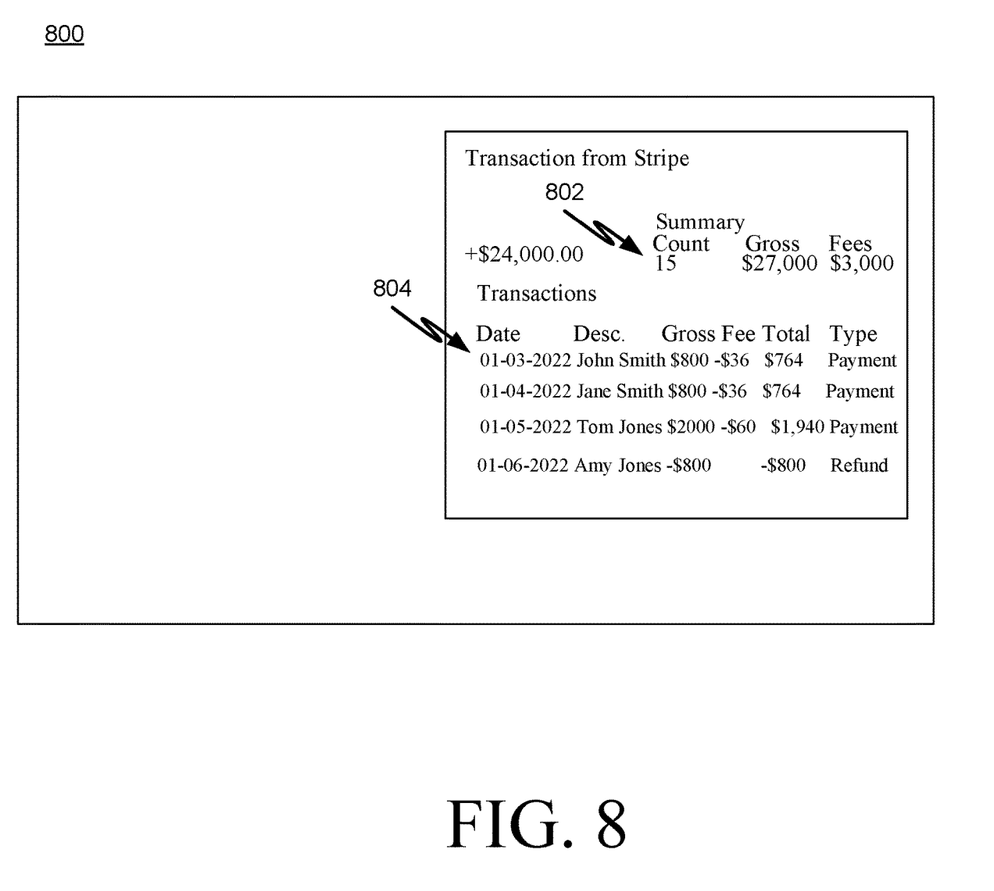
FIG. 8 is a diagram of an example illustration of a user interface displaying enhanced details of a deposit transaction in accordance with some implementations.

FIG. 8 is a diagram of an example illustration of a user interface displaying details of a transaction in accordance with some implementations. 800 is an example user interface displaying example enhanced deposit transaction information 804 corresponding to an example deposit transaction 802 (corresponding to 602 in FIG. 6). In this context, enhanced deposit transaction information refers to one or more details of a transaction, i.e., a transaction corresponding to a deposit of payment made into an account of the user from an account associated with the user and belonging to the third-party payment acquisition platform.

Figure 9:
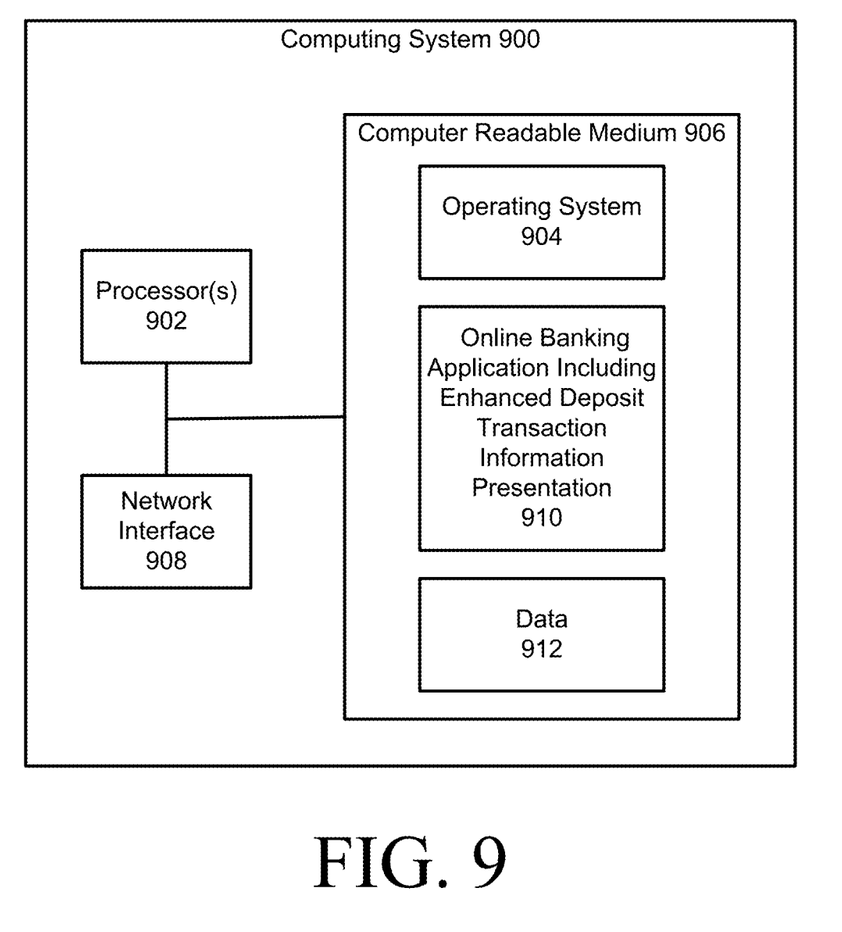
FIG. 9 is a block diagram of an example computing system which may be used for one or more implementations described herein.

FIG. 9 is a block diagram of an example computing system which may be used for one or more implementations described herein. In some implementations, the example computing system 900 includes one or more processors 902, an operating system 904, a memory 906 (e.g., computer readable media), a network interface 908, an online banking application for presenting enhanced deposit transaction (e.g., a deposit made to an account) information and data 912.

Processor(s) 902 can be one or more processors and/or processing circuits to execute program code and control basic operations of the computing system 900. A "processor" includes any suitable hardware and/or software system and/or mechanism(s) and/or component(s) that process data, signals, or other information. A processor may include a system with a general-purpose central processing unit (CPU), multiple processing units, dedicated circuitry for achieving functionality, or other applicable systems. Processing need not be limited to a particular geographic location or have temporal limitations. For example, a processor may perform its functions in "real-time," "offline," in a "batch mode," etc. Portions of processing may be performed at different times and at different locations by different (or the same) processing systems. A computer may be any processor in communication with a memory.

Memory 906 is typically provided in the computing system 900 for access by the processor(s) 902 and may be any suitable processor-readable storage medium, e.g., random access memory (RAM), read-only memory (ROM), Electrical Erasable Read-only Memory (EEPROM), flash memory, etc., suitable for storing instructions for execution by a processor, and the memory 906 may be located separate from the processor(s) 902 and/or integrated therewith. Memory 906 can store software operating on the computing system 900 by the processor(s) 902, including an operating system 904, one or more applications 910, and data 912. In some implementations, applications 910 can include instructions that enable processor(s) 902 to perform the functions described herein, e.g., some or all of the methods shown in FIGS. 2-4.

For example, applications 910 can include a computer or software application, which as described herein can provide details of a transaction (e.g., as shown in one or more of FIGS. 2-4 or in FIG. 8) and other functions, e.g., providing user interfaces for presenting information (e.g., FIG. 5) or prompts to users (e.g., FIG. 6) or for enabling users to enter user access credentials (e.g., FIG. 7). Any of the software in memory 904 can alternatively be stored in any other suitable storage location or computer-readable medium. In addition, memory 904 (and/or other connected storage device(s)) can store images, video, and other instructions and data used in the features described herein. Memory 904 and any other type of storage (magnetic disk, optical disk, magnetic tape, or other tangible media) can be considered "storage" or "storage devices".

Network interface 908 can provide functions to enable interfacing the computing system 900 with other systems and/or devices. For example, network communication devices, servers, storage devices (e.g., memory and/or database devices), and input/output devices can communicate via interface 908. In some implementations, the network interface 908 can connect to interface devices, including input devices (keyboard, pointing device, touchscreen, microphone, camera, scanner, etc.) and/or output devices (display device, speaker devices, printer, motor, etc.).

For ease of illustration, FIG. 9 shows one block for each of processor(s) 902, memory 906, network interface 908, software block 910, and data 912. These blocks may represent one or more processors or processing circuitries, operating systems, memories, I/O interfaces, databases, applications, and/or software modules. In other implementations, the computing system 900 may not have all of the components shown and/or may have other elements, including other types of elements instead of, or in addition to, those shown herein.

One or more methods described herein can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in and provided as an electronic signal, for example, in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g., Field-Programmable Gate Array (FPGA), Complex Programmable Logic Device), general purpose processors, graphics processors, Application Specific Integrated Circuits (ASICs), and the like. One or more methods can be performed as part of or as a component of an application running on the system, or as an application or software running in conjunction with other applications and an operating system.

One or more methods described herein can be run in a standalone program that can be run on any type of computing device, a program that can be run on a web browser, a mobile application ("app") that can be run on a mobile computing device (e.g., cell phone, smart phone, tablet computer, wearable device (wristwatch, armband, jewelry, headwear, goggles, glasses, laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive.

Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, or microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly, or the like. The instructions can also comprise code and data objects provided in accordance with, for example, the Visual Basic™ language, or another structured or object-oriented programming language. The sequence of programmed instructions, or programmable logic device configuration software, or data associated therewith can be stored in a nontransitory computer-readable medium such as a computer memory or storage device, which may be any suitable memory apparatus, such as, but not limited to ROM, PROM, EEPROM, RAM, flash memory, disk drive, and the like.

Furthermore, the modules, processes, systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors, or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules) may be implemented on a general-purpose computer, a special-purpose computer, a programmed microprocessor or microcontroller and peripheral integrated circuit element, an ASIC, or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system(s), microprocessor, or microcomputer being utilized. Embodiments of the method, system, and computer program product can be implemented in hardware and/or software using any known or later developed systems or structures, devices, and/or software by those of ordinary skill in the applicable art from the functional description provided herein and with a general basic knowledge of software engineering, image processing, and/or machine vision arts.

Moreover, embodiments of the disclosed method, system, and computer readable media (or computer program product) can be implemented in software executed on a programmed general-purpose computer, a special purpose computer, a microprocessor, a network server or a switch, or the like.

It is therefore apparent that there are provided, in accordance with the various embodiments disclosed herein, methods, systems, and computer readable media for procuring and presenting deposit transaction details.

While the disclosed subject matter has been described in conjunction with a number of embodiments, it is evident that many alternatives, modifications, and variations would be, or are, apparent to those of ordinary skill in the applicable arts. Accordingly, Applicant intends to embrace all such alternatives, modifications, equivalents, and variations that are within the spirit and scope of the disclosed subject matter.

What is claimed is:

1. A method of controlling an online banking platform to provide an online banking statement user interface displaying enhanced deposit information to a user showing details of a consolidated payment deposit transaction from a third-party payment acquisition platform, the consolidated payment deposit transaction representing a plurality of goods and/or services purchased by one or more customers of the user, the method comprising:

displaying, within the online banking statement user interface of the online banking platform, a deposit transaction received from the third-party payment acquisition platform;

providing an enhanced deposit transaction information user-interface element in the online banking user interface of the online banking platform, where the enhanced deposit transaction information user-interface element is provided in conjunction with the deposit transaction received from the third-party payment acquisition platform, wherein the deposit transaction corresponds to an account in the third-party payment acquisition platform associated with a user;

receiving an indication of user selection of the enhanced deposit transaction information user-interface element corresponding to the deposit transaction;

presenting a user access credentials user-interface in response to receiving the indication of user selection of the enhanced deposit transaction information user-interface element;

receiving, via the user access credentials user-interface, user access credentials for the account in the third-party payment acquisition platform from the user in response to the indication of the user selection of the enhanced deposit transaction information user-interface element corresponding to the deposit transaction;

securely accessing the third-party payment acquisition platform using the user access credentials;

procuring enhanced deposit transaction information from the third-party payment acquisition platform, wherein the enhanced deposit transaction information corresponds to the deposit transaction, wherein the enhanced deposit transaction information includes one or more details of the deposit transaction from the account associated with the user in the third-party payment acquisition platform retrieved using the user access credentials to access the account, and wherein the enhanced deposit transaction information includes additional transaction information beyond information contained in the deposit transaction including details of one or more purchases from the one or more customers of the user processed by the third-party payment acquisition platform; and presenting the enhanced deposit transaction information within the online banking statement user interface of the online banking platform.

2. The method of claim 1, further comprising:
receiving a request from the user for additional enhanced deposit transaction information corresponding to one or more items within the enhanced deposit transaction information, wherein the additional enhanced deposit transaction information includes additional information beyond the additional transaction information contained in the enhanced deposit transaction information;

procuring the additional enhanced deposit transaction information from the account associated with the user in the third-party payment acquisition platform using the user access credentials; and presenting the additional enhanced deposit transaction information along with the enhanced deposit transaction information, wherein the presenting includes providing one of the additional enhanced deposit transaction information procured from the third-party payment acquisition platform to the user or a user-interface of the third-party payment acquisition platform to communicate the additional enhanced deposit transaction information to the user.

3. The method of claim 1, further comprising:
detecting an incoming deposit transaction from the account associated with the user in the third-party payment acquisition platform;

presenting the incoming deposit transaction along with an option to receive additional deposit information;

receiving a request from the user to present the additional deposit information of the incoming deposit transaction, wherein the request corresponds to the user exercising the option;

procuring additional information corresponding to the additional deposit information from the account associated with the user in the third-party payment acquisition platform using the user access credentials; and presenting the additional deposit information to the user along with the incoming deposit transaction.

4. The method of claim 3, wherein the incoming deposit transaction is one of a pending deposit transaction or a completed deposit transaction.

5. The method of claim 1, further comprising:
analyzing past deposit transactions corresponding to the account associated with the user in the third-party payment acquisition platform;

retrieving additional information corresponding to a predicted deposit transaction, wherein the predicted deposit transaction is determined based on the analyzing of past deposit transactions; and presenting the additional information along with the predicted deposit transaction.

6. The method of claim 5, further comprising:
receiving a request from the user for additional deposit transaction information;

procuring additional information corresponding to the additional deposit transaction information from the account associated with the user in the third-party payment acquisition platform using the user access credentials; and presenting the additional deposit transaction information along with the predicted deposit transaction.

7. The method of claim 1, further comprising:
analyzing past deposit transactions corresponding to the account associated with the user in the third-party payment acquisition platform;

retrieving additional information corresponding to a pending deposit transaction, wherein the pending deposit transaction is identified based on the analyzing of past deposit transactions; and presenting the additional information along with the pending deposit transaction.

8. The method of claim 7, further comprising:
receiving a request from the user for additional deposit transaction information;

procuring additional information corresponding to the additional deposit transaction information from the account associated with the user in the third-party payment acquisition platform using the user access credentials; and presenting the additional deposit transaction information along with the pending deposit transaction.

9. A method of controlling an online banking platform to provide an online financial user interface displaying enhanced deposit information to a user showing details of a consolidated payment deposit transaction from a third-party payment acquisition platform, the consolidated payment deposit transaction representing a plurality of goods and/or services purchased by one or more customers of the user, the method comprising:

displaying, within the online financial user interface of the online banking platform, a deposit transaction received from the third-party payment acquisition platform;

providing an enhanced deposit transaction information option in the online financial user interface, where the enhanced deposit transaction information option is provided in conjunction with a deposit transaction received from the third-party payment acquisition platform, wherein the deposit transaction corresponds to an account in the third-party payment acquisition platform associated with a user, and wherein the enhanced deposit transaction information includes details of one or more purchases processed by the third-party payment acquisition platform;

receiving an indication of user selection of the enhanced deposit transaction information user-interface element corresponding to the deposit transaction;

presenting a user access credentials user-interface;

receiving user access credentials, via the user access credentials user-interface, for the account in the third-party payment acquisition platform from the user in response to the user exercising the enhanced deposit transaction information option corresponding to the deposit transaction;

procuring enhanced deposit transaction information from the third-party payment acquisition platform, wherein the enhanced deposit transaction information corresponds to the deposit transaction, wherein the enhanced deposit transaction information includes one or more details of the deposit transaction from the account associated with the user in the third-party payment acquisition platform using the user access credentials to access the account, wherein the enhanced deposit transaction information includes additional transaction information beyond information contained in the deposit transaction including details of one or more purchases from the one or more customers of the user processed by the third-party payment acquisition platform; and presenting the enhanced deposit transaction information within the online financial user interface of the online banking platform.

10. The method of claim 9, further comprising:

receiving a request from the user for additional enhanced deposit transaction information corresponding to one or more items within the enhanced deposit transaction information, wherein the additional enhanced deposit transaction information includes additional information beyond the additional transaction information contained in the enhanced deposit transaction information;

procuring the additional enhanced deposit transaction information from the account associated with the user in the third-party payment acquisition platform using the user access credentials; and presenting the additional enhanced deposit transaction information along with the enhanced deposit transaction information, wherein the presenting includes providing one of the additional enhanced deposit transaction information procured from the third-party payment acquisition platform to the user or a user-interface of the third-party payment acquisition platform to communicate the additional enhanced deposit transaction information to the user.

11. The method of claim 9, further comprising:

detecting an incoming deposit transaction from the account associated with the user in the third-party payment acquisition platform;

presenting the incoming deposit transaction along with a user interface element to receive additional deposit information;

procuring additional information corresponding to the additional deposit information from the account associated with the user in the third-party payment acquisition platform using the user access credentials in response to the user exercising the option corresponding to the incoming deposit transaction; and presenting the additional deposit information to the user along with the incoming deposit transaction.

12. The method of claim 11, wherein the incoming deposit transaction is one of a pending deposit transaction or a completed deposit transaction.

13. The method of claim 9, further comprising:

analyzing past deposit transactions corresponding to the account associated with the user in the third-party payment acquisition platform;

retrieving additional information corresponding to a predicted deposit transaction, wherein the predicted deposit transaction is determined based on the analyzing of past deposit transactions; and presenting the additional information along with the predicted deposit transaction.

14. The method of claim 13, further comprising:

receiving a request from the user for additional deposit transaction information;

procuring additional information corresponding to the additional deposit transaction information from the account associated with the user in the third-party payment acquisition platform using the user access credentials; and presenting the additional deposit transaction information along with the predicted deposit transaction.

15. The method of claim 9, further comprising:

analyzing past deposit transactions corresponding to the account associated with the user in the third-party payment acquisition platform;

retrieving additional information corresponding to a pending deposit transaction, wherein the pending deposit transaction is identified based on the analyzing of past deposit transactions; and presenting the additional information along with the pending deposit transaction.

16. The method of claim 15, further comprising:

receiving a request from the user for additional deposit transaction information;

procuring additional information corresponding to the additional deposit transaction information from the account associated with the user in the third-party payment acquisition platform using the user access credentials; and presenting the additional deposit transaction information along with the pending deposit transaction.

17. A method of controlling an online banking platform to provide an online financial user interface corresponding to an account of a user, the online financial user interface displaying enhanced deposit information showing details of a consolidated payment deposit transaction from a third-party payment acquisition platform, the consolidated payment deposit transaction representing a plurality of goods and/or services purchased by one or more customers of the user, the method comprising:

presenting a user access credentials user interface within an online banking user interface of the online banking platform, wherein the user interface is configured to receive user access credentials for a third-party payment acquisition platform account associated with a user;

receiving, via the user access credentials user interface, user access credentials for an account associated with the user in the third-party payment acquisition platform;

analyzing one or more past deposits and one or more transactions from the third-party payment acquisition platform corresponding to the third-party payment acquisition platform account associated with the user, wherein the one or more transactions include one or more purchases by the one or more customers of the user that have not been included in a consolidated deposit made by the third-party payment acquisition platform to an account in the online banking platform associated with the user;

predicting a future deposit transaction based on the analyzing, wherein the predicted future deposit includes third-party payment acquisition platform transactions that are not included in one or more of a completed deposit transaction or a pending deposit transaction;

presenting the predicted future deposit transaction along with an enhanced deposit transaction information user interface element;

receiving an indication of selection of the enhanced deposit transaction information user interface element by the user;

procuring enhanced deposit transaction information corresponding to the predicted future deposit transaction;

analyzing past transactions corresponding to the third-party payment acquisition platform account associated with the user;

determining the predicted future deposit transaction based on the analyzing; and presenting the enhanced deposit transaction information along with the predicted future deposit transaction to the user when the enhanced deposit transaction information user interface element is selected by the user.

18. The method of claim 17, further comprising:

receiving a request from the user for additional enhanced deposit transaction information corresponding to one or more items within the enhanced deposit transaction information, wherein the additional enhanced deposit transaction information includes additional information beyond additional transaction information contained in the enhanced deposit transaction information;

procuring the additional enhanced deposit transaction information from the third-party payment acquisition platform account associated with the user; and presenting the additional enhanced deposit transaction information along with the enhanced deposit transaction information, wherein the presenting includes providing one of the additional enhanced deposit transaction information procured from the third-party payment acquisition platform to the user or a user-interface of the third-party payment acquisition platform to communicate the additional enhanced deposit transaction information to the user.

19. The method of claim 18, further comprising:

detecting an incoming deposit transaction from the third-party payment acquisition platform account associated with the user;

presenting the incoming deposit transaction along with an option to receive additional deposit information;

receiving a request from the user to present the additional deposit information of the incoming deposit transaction, wherein the request corresponds to the user exercising the option;

procuring additional information corresponding to the additional deposit information from the third-party payment acquisition platform account associated with a user; and presenting the additional deposit information to the user along with the incoming deposit transaction.

20. The method of claim 19, wherein the incoming deposit transaction is one of a pending deposit transaction or a completed deposit transaction.

* * * * *